Patented Mar. 4, 1952

2,587,657

UNITED STATES PATENT OFFICE 2,587,657

EMULSION COATING COMPOSITIONS AND PROCESS FOR PREPARING SAME

Edward Schulte and Philip C. Herzog, Cleveland, Ohio, assignors to The Glidden Company, Cleveland, Ohio, a corporation of Ohio No Drawing. Application January 20, 1950, Serial No. 139,783

19 Claims. (Cl. 106—236)

This invention is a continuation-in-part of application Serial No. 732,930, filed March 6, 1947, now abandoned, and relates to improvements in water-reducible emulsion coating compositions, and relates more particularly to emulsion varnishes and emulsion enamels which deposit glossy coatings. It also relates to processes for producing stable water-reducible emulsion varnishes and enamels.

Without attempting to trace the chronological development of water paints, suffice it to point out that there are and have been various types of water paints ranging from those composed of water, pigment and an adhesive binder such as casein or similar protein, to the more advanced types which contain an oleoresinous film-forming component capable of providing a water-resistant pigmented film. Of the latter type, there are oil-in-water emulsions and there are water-in-oil emulsions, both being water-reducible to lower solids contents at which stage they are both oil-in-water emulsions. A different type, not properly termed a water-reducible paint but sometimes confused with such paints, is a pigmented emulsion paint in which an oleoresinous binder constitutes the continuous phase and water constitutes the discontinuous phase of the emulsion but the composition is such that it is not reducible with water but rather is thinned with the usual paint-thinners; and while enamel paints of this latter type have been made, they involve none of the problems which arise in attempting to make a stable water-reducible emulsion enamel such as constitutes the primary objective of this invention.

Stable water-reducible enamels have long been sought although the literature abounds with statements to the effect that such gloss water-paints have been made. Whether or not they have been made, it has remained so far as we are aware that such gloss water-paints have not been marketed prior to our invention. A marketable product represents a high order of coordination of materials and properties, since the emulsion must be stable for extended periods of time under wide variations in treatment and handling; i. e., it should be sufficiently stable to withstand at least one accidental freezing; it should be stable when allowed to stand for weeks and preferably for months at high summer temperatures; it should be thinnable with water by the ordinary consumer who is apt to have no respect whatever for the delicate balance of forces which are embodied in a water-reducible emulsion paint; the emulsion must be stable enough to be applied in usual manners as by brushing, spraying, etc.; it must dry reasonably fast; it should not be materially affected by oil paint coatings of the common kinds over which it is to be applied; it should be applicable to the usual materials on which paints of any type are commonly applied; and, of course, its dried films should have all the other properties of durability, washability, and freedom from flaking, checking, cracking, etc., induced by light, heat, air, moisture and fumes which are commonly expected of paints and lacquers of conventional types. In addition the paint must be capable of formulation from common raw materials such as varnish ingredients, pigments, etc., so that it may be sold at a price which makes it competitive within at least a portion of the paint market. In view thereof, it is apparent that emulsion paints involve all of the extended technology of conventional paints and lacquers and in addition involve many of the little understood physico-chemical relationships peculiar to emulsions. Nevertheless, through this invention, a stable water-reducible enamel may be produced from readily available raw materials at costs which make the emulsion enamel competitive with conventional enamels.

Accordingly, it is an object of this invention to provide commercially-marketable water-reducible coating compositions capable of producing glossy films.

It is a further object to provide a water-reducible enamel paint which can be marketed in commerce to the average paint consumer and can be applied by him without giving greater attention to instructions than is customarily given to conventional paints.

It is a further object to provide commercial processes for producing water-reducible flat, semi-gloss and gloss paints.

It is a further object to provide a commercially-marketable water-reducible oleoresinous coating emulsion which can be formulated to provide flat, semi-gloss or glossy films of improved characteristics.

These and other objects will be apparent from the following description of the invention.

In the course of our investigation of colloid-stabilized emulsion systems containing film-forming materials dispersed as a discontinuous phase in water, we have discovered that when the emulsifying agent is a reaction product of a fatty acid and a hydroxy amine, and when the hydroxy amine is present in excess of the amount needed to satisfy all the requirements of the emulsion system so as to provide a quantity of free or uncombined amine in the system, then the system is so altered that the coating emulsion, when suitably prepared, dries to a glossy film and may be suitably pigmented to form an emulsion enamel. On the basis of this discovery we are able to prepare water-reducible gloss emulsion varnishes and enamel paints. However, we have also found that there are other conditions which must be concurrently provided in the emulsion to accomplish these results, and these conditions will be discussed hereinafter. We wish it to be understood, however, that if these other conditions are provided without concurrently providing the free or uncombined amine, our gloss emulsions and enamel paints cannot be obtained.

One of the requisite concurrent conditions is that the size of the particles of film-forming material in the emulsion should be finer than about one-half micron, although a minor percentage of the particles may be as large as about 5 microns. Such particle size can be readily obtained by various methods, examples of which are given hereinafter.

Another requisite concurrent condition is that the size of the colloid particles should be not substantially greater than about one micron. Casein, soya protein or other alkali-soluble protein which has been peptized or dispersed in alkaline solutions generally has a satisfactory particle size for our purposes, but we mention the limiting particle size so that it will be clear to those skilled in the art that unusual dispersing methods may lead to difficulty if they fail to provide a sufficiently fine particle size.

A further concurrent condition is that the total weight of protective colloid should preferably not be greater than about one-sixth of the weight of the film-forming materials. Such large concentrations are seldom necessary in a system to effect the necessary stabilization of the emulsion and we prefer to keep the concentration as low as practicable to provide sufficient stability. As little protein colloid as 5% by weight of the varnish may frequently be adequate for this purpose, but we generally prefer to use between about 8% and 12% on a weight basis. When non-proteinaceous colloids are used, the minimum concentration varies with particular colloid and is best determined by experiment, as described below. 2% or more of methylcellulose has been found suitable. It should be recognized that emulsion stability is an important factor in a marketable emulsion coating composition, as has been pointed out in the opening paragraphs of this specification. At the same time it is difficult to define the conditions which produce the required degree of stability. We have found, however, that if a film of emulsion coating composition can be applied by means of a brush without breaking down, so that the film remains intact, and the coating composition can be freely washed from the brush with water, then the emulsion has adequate stability for general marketability and may be applied by any of the other usual methods such as by spraying, dipping, flowing, etc. without breaking. Accordingly, we use and recommend a brushing test as an empirical method for determining whether or not the emulsion is adequately stable for use as a coating composition. By employing such a test one can readily determine the minimum amount of any particular protective colloid which is required in a selected emulsion system.

From what has been said above, it should be clear that our invention comprises a water-reducible emulsion coating composition which contains the following ingredients:

1. One or more organic film-forming materials having the characteristics of varnishes.
2. One or more emulsifying soaps formed by reaction of an organic acid with an hydroxy amine.
3. Free or uncombined hydroxy amine.
4. Water.
5. Protective colloid, such as alkali-soluble protein colloid (e. g. soya protein or other vegetable or animal protein) or other organic colloids such as methylcellulose, carboxy methylcellulose, etc.
6. Pigment, when enamels are desired. The pigment is omitted, of course, when the emulsion is intended to deposit a clear varnish film.

We will discuss these ingredients individually to indicate the characteristics, attributes, properties, etc. which we prefer to have in the respective ingredients, and we will also point out further the proportions which each ingredient should bear with respect to the others. Before proceeding to those discussions, however, we wish to explain an underlying principle or mode of behavior which we have observed, and which we believe promotes a somewhat clearer understanding of the invention. In the course of our research we have noticed that protein-stabilized emulsions of film-forming materials capable of drying to a gloss fail to deposit a glossy film except when there is uncombined or free hydroxy amine in the system. On studying this failure, we observed that when no free amine is present the protein or a part of it acts as a flatting agent or pigment in the dry film, thereby obscuring the inherent glossy character of the film-forming material. When free or uncombined hydroxy amine is present under otherwise similar conditions, the protein is prevented from pigmenting or "flatting" the film to a greater or lesser extent, depending on the particular amine or combination of amines present. Thus the essential aim of this invention is to reduce or eliminate the pigmenting effects of the protective colloid stabilizers in emulsion systems, by providing free or uncombined hydroxy amines in the system. In order to so supply free amine in the system, it is obviously necessary not only to satisfy all other demands of the system for such amines, but also to exceed such other demands. A free or uncombined quantity of amine may then be maintained in the system.

1. FILM-FORMING MATERIALS

Various film-forming materials having the characteristics of varnish and polymerizable monomers yielding such films may be used as the film-forming component of the emulsion varnishes and enamels of the invention. One extensive class of film-forming materials is the oleoresinous group of varnish materials such as Congo varnishes, ester-gum varnishes, pure and modified phenolic resin varnishes, pure and modified alkyd resin varnishes, and maleic resin varnishes. Those skilled in the art will recognize the large number of specific formulations which are embraced within these various types of oleoresinous materials, and we wish it to be clearly understood that we contemplate the use of any of such formulations in this invention. Other classes and types of film-forming materials, distinct from the oleoresinous types, are also contemplated and their suitability for the purposes of this invention will be readily recognized by those skilled in the art. We particularly mention such water-resistant film-forming materials as natural rubber and the emulsion-polymerized synthetic elastomeric materials of the type of butadiene polymers, elastomeric styrene polymers, butadiene-styrene copolymers, polyester elastomers, polythylene elastomers, and the oil-modifications of each.

One characteristic which should be secured in any oleoresinous varnish intended for use in our emulsion enamel is a low acid number. This is not an essential characteristic but is to be preferred over a medium or high acid number. Furthermore, it is a matter of great convenience in commercial operations to maintain a constant acid number from batch to batch. The reason for these preferences will be readily understood when it is recalled that the emulsion system contains free amine which may be capable of reacting with any of the acids of the oleoresinous component to form corresponding amine soaps of those acids. If the acid number of the oleoresinous component is low, and constant from batch to batch, sufficient hydroxy amine may be provided in the formulation to take care of any which is consumed in neutralizing the available free acids of the oleoresinous component, and of any consumed in satisfying the requirements of the protein, thereby to provide the necessary free or uncombined amine. Furthermore, if the acid number is low and constant, the amount of amine soaps formed in situ by reaction of the amine with fatty acids of the varnish will be small and of fixed amount. If such soaps are not of proper characteristics to act as the primary emulsifier, and their presence is not harmful when in fixed amounts, then a suitable amount of other emulsifier may be added to the system. On the other hand, if such soaps are suitable as emulsifiers with or without added emulsifiers, then it is desirable to have their amount fixed from batch to batch rather than to have them fluctuate over a range which may not be the range within which the total amount of emulsifier should be kept. Furthermore, the acid number is merely a measure of total free acids and does not indicate the kinds of free acids which are present. Hence, even when the acid number is constant, the kinds of acid may vary from batch to batch so that the kinds of soap formed may vary also. Then an uncontrollable variable enters into the system, and it may be difficult to adapt the formulation to this fluctuating variable. Accordingly, if the acid number is kept low, any disturbing effects arising from the formation of unknown soaps are more apt to be kept within limits which do not disrupt the whole emulsion system. For commercial purposes, therefore, it is highly desirable to select the oleoresinous materials which are apt to be most uniform in respect to the kinds of free acids which might be present in the finished varnish, and then to process them into varnishes by methods and techniques which are most apt to produce not only the desired varnish characteristics but also a varnish having only small amounts of unknown free acids. Formulations of the emulsion system may then be predetermined on a definite basis and the need for adjustments from batch to batch will be minimized. It is well within the ability of those persons skilled in this art to select the various ingredients, methods and techniques to accomplish the ends just described. From what has been said above, we do not intend to imply that the amines react with and completely neutralize all of the free acids of a varnish. It should be understood, instead, that the amines may react with only some of the varnish acids (particularly those on the surface of the dispersed particles of varnish), the extent depending on the reactivities which are promoted by the conditions actually prevailing in the emulsion system. The free amine is in excess of any requirements which may so exist in the emulsion, and is evidenced at least in part by attaining a stable alkaline pH in the emulsion.

As to the length of the varnish, a twenty-five gallon length is very satisfactory but any length from very short to very long may be used without undue difficulty.

Any varnish selected for use in our emulsion coating composition should be of such character that it will be substantially inert or non-reactive with respect to the other ingredients of the coating compositions, beyond those reactions due to its acid number, all to the end that its ability to form a durable varnish film will remain unimpaired by the presence of the other ingredients. Furthermore, the varnish should be capable of drying to a film having a specular gloss at least as high as that desired in the film deposited from the emulsion, and preferably should be capable of drying to a glossy film. The varnish may be made up to include usual amounts and kinds of driers, as amply understood by those skilled in the art. Small percentages of solvents may also be included, if desired. What has been said here with respect to oleoresinous varnishes applies equally well to other types of acidic film-forming materials capable of forming a film having a specular gloss above about 40.

2. THE EMULSIFIER

The saponaceous emulsifiers which are suitable for the purposes of this invention must be selected so as to have the proper "balance," the term "balance" referring to that characteristic of surface-active agents so clearly illustrated by Benjamin R. Harris in his United States Patent No. 1,917,250, and discussed in papers and treatises on emulsions and surface-active agents such as that of Foster Dee Snell in Industrial and Engineering Chemistry, vol. 35, No. 1, pages 107–117 (January 1943). The "balance" of morpholine oleate, for example, is somewhat different from that of morpholine stearate or of the 2-amino-2-methyl-1-propanol oleate, but all are within the range of "balance" needed for our water-varnish-colloid system when adjusted to the particular characteristics of the varnish components. Various degrees of "balance" may be obtained by combining different hydroxy amines with one or another of the organic acids mentioned below. While the various soaps may not be substituted one for the other on equal weight basis, it is a simple matter to determine by experiment how much of any one or of a combination is needed to emulsify a particular batch of varnish. We have found that for the particular soaps named above a minimum amount of about 8% by weight of the varnish is satisfactory, but when other soaps are used, smaller proportions are frequently useful. The exact amount of any selected soap which is used in a particular batch of emulsion is best determined by trying progressively smaller amounts in a series of small test batches until an insufficient amount of emulsifier has been determined. The final batch may then be made up by using a small excess of emulsifier over the minimum effective quantity so determined by experiment. Large excesses of emulsifier should be avoided since they may impair the drying properties and washing resistance of the applied film. Various organic acids may be used when due regard is given to the "balance" of their respective hydroxy amine soaps. We prefer to use organic acids having 12 to 20 carbon atoms, and we especially prefer fatty acids. The saturated or unsaturated fatty acids commonly found in drying, semi-drying and non-drying oils give hydroxy amine soaps which are particularly useful.

The emulsifiers may be made up as a stock solution by simply mixing together stoichiometric proportions of fatty acid and the amine. Likewise, the emulsifier may be prepared in situ by adding stoichiometric proportions of fatty acid and the amine to the mixing tank containing the varnish and water which are to be emulsified. We prefer, however, to have the emulsifier available in the form of a preformed stock solution, since it facilitates the operations, and in addition makes it possible to incorporate a sufficient excess of amine in the stock solution to supply all or a part of the amine needed to produce an emulsion system which contains free or uncombined amine.

3. FREE AMINE

The minimum amount of free or uncombined hydroxy amine needed in an emulsion system containing varnish, water and proteinaceous colloid depends somewhat on the particular characteristcis of the varnish and on the amount and kind of colloid employed. For oleoresinous varnishes of low acid number, and with maximum colloid concentration, the concentration of free hydroxy amine, such as morpholine of 2-amino-2-methyl-1-propanol, should ordinarily be at least about 1.5% by weight of the varnish; and for the same varnish containing a minimum effective amount of colloid, the uncombined or free concentration of these amines may be as low as about .2% by weight of the varnish. Usually the smallest concentration of hydroxy amine which may be used will be between about .1% and 2% of the varnish or other film-forming material. Since amounts larger than the minimum quantity are apt to impair the drying qualities of a varnish, we prefer to use no more free amine than is necessary to develop the desired specular gloss.

If we desire to incorporate all of the free amine in the stock solution of emulsifier, we may, for example, make up the stock solution by mixing about equal weights of oleic acid and 2-amino-2-methyl-1-propanol. These proportions provide about a 50% excess of this amine over stoichiometric proportions. If, instead, we prefer to use all or part of the free amine in peptizing and dispersing the colloid, then the stock solution of emulsifier may be made up so as to contain any part of the amine not so used for peptizing purposes or any portion of the amine not used for peptizing purposes may be added directly to each batch in the mixing tank.

Free amine is preferably provided in the emulsion when the latter is being prepared, since its effectiveness is then greater than when added after the stabilized emulsion has been completed. We particularly prefer to incorporate at least some free amine in the emulsion before the protein dispersion is added since this has been found to materially assist the development of a glossy film.

Any hydroxy amine which by reason of its chemical constitution is capable of assuming an oriented position with respect to protein molecules may be employed to provide the free amine in the emulsion system, and, or not, to satisfy any amine requirements of the protein in the system. Such hydroxy amines, if also suitable for forming the emulsifier, may perform all three functions in the system. Certain amines are more suitable than others, however, in forming emulsifiers of proper balance, so that it is within the scope of our invention to employ two or more different amines in the same emulsion, one or more of which are combined with organic acids, added or present in the system, to form emulsifiers of proper balance, and an other or others of which may satisfy the protein requirements and/or free amine requirements. The following hydroxy amines are suitable for performing at least one of these functions in our emulsion systems, and in particular instances may perform all of the functions mentioned above: morpholine; 2-amino-2-methyl-1-propanol; 2-amino-2-methyl-1,3-propanediol; 2-amino-2-ethyl-1,3-propanediol; 2-amino-2-hydroxymethyl-1,3-propanediol; 2-amino-1-butanol; ethyl monoethanolamine, diethyl ethanolamine; aminoethylethanolamine; isobutanolamine; ethyldiethanolamine; triisopropanolamine; dimethylethanolamine; 4-amino-4-methyl-2-pentanol; and tris-(hydroxymethyl)amino methane. The use of these amines and of related hydroxy amines will be understood more fully from the subsequent examples.

The ability of hydroxy amines to become oriented with respect to protein molecules, so as to overcome the pigmenting effect of protein in our emulsions, is believed to be due to the presence in the amine molecules of both an amine radical and an hydroxyl radical attached to the same or different carbon atoms so as to result in a molecular configuration in which these hydrophilic groups are grouped with respect to each other in such manner as to allow lyophilic groups in the amine molecule to become exposed or accessible to the oil phase of the emulsion. We believe that when the configuration of the amines is of this general nature the hydrophilic groups therein are attracted to the protein molecules, and so orient the amine molecule that its lyophilic groups may be attracted to the oil phase of the emulsion. When such effects are induced by the amine, the protein is believed to be attracted to the oil phase in sufficient degree in some instances to reduce and in other instances to suppress the observed pigmenting effect of the protein. We do not want to be bound by this expressed theory, however. It appears that the amines mentioned above are orientable in accordance with the theory, and yield varying degrees of improvement in gloss. It also appears that the hydroxy amines in which the ratio of carbon atoms to the sum of the number of hydroxyl and amino groups is between 1 to 1 and 3 to 1 are especially useful. We do not exclude higher ratios, however, since higher ratios tend to improve orientation when the hydroxyl and amino groups occupy closely adjacent positions near one or more extremities of the molecule. Higher ratios under such conditions also tend to improve the lyophilic attraction. When the ratios become too high, however, the element of proper "balance" between lyophilic and hydrophilic groups becomes a factor of considerable importance, and for practical work we prefer to avoid the complications arising therefrom by selecting hydroxy amines in which the lower ratios prevail.

While we have expressed the theory that the ability of certain hydroxy amine molecules to become oriented is a factor in overcoming the pigmenting effect of protein, we do not intend this expression to exclude other possibilities as factors in the accomplishment of our purposes. The amines may exert some solubilizing effects on the protein or other colloids so as to make them wettable by the dispersed film-forming materials of the emulsion; that is, they may behave in some degree as mutual solvents or as wetting agents; they may also behave as protein dispersing agents so as to prevent agglomeration of the protein into particles having a pigmentary size. All of these possible effects may occur together, or one or more of them may predominate, but whether they or other effects occur individually or collectively in any combination, one ultimate and observed effect of the presence of uncombined amine in the system is, as we have explained, that of suppressing or eliminating the pigmenting effect of the protective colloid. It should be recognized that the pigmenting effect of different colloids is apt to vary considerably, and due regard should be given thereto in selecting an appropriate amount and kind of amine.

4. WATER

We prefer to use distilled water or natural soft water but most waters suitable for human consumption can be used. Hard waters may require preliminary chemical treatment to precipitate the polyvalent minerals thereof in the form of stable compounds which will remain inert to the emulsion ingredients if the precipitated compounds are left in the completed emulsion. The amount of water contained in the emulsion prior to its application as a coating material is not critical so long as there is enough water present to produce a stable, water-reducible emulsion. The emulsion may then be reduced at the time of application by adding whatever water is desired to provide a good working consistency. Ultimate reduction to a solids content of about 55% is satisfactory, but greater or less reduction may be used.

In preparing the emulsion, part of the total water content is advantageously derived from the colloid dispersion, and part may be derived from other similar solutions.

5. PROTECTIVE COLLOID

We prefer to use casein or soya protein alone or in mixtures with each other, with or without minor additions thereto of alginates, but other organic protective colloids or other alkali-soluble proteins or mixtures of proteins with each other or with other organic colloids may be used equally well.

Dispersions of proteins in water are usually prepared separately from the emulsion by using any of the usual "cutting" or dispersing methods and reagents. However, since the alkalies generally used for such purposes ultimately are deposited in the dry film of coating composition and impair its water resistance, we prefer to use as little of such alkalies as possible and to supplement such alkalies with hydroxy amines. The dispersions may be made up to contain from about 17½% to 18% total solids, with about 14% protein, but more or less concentrated dispersions may be employed since the concentration thereof only affects the amount of water which is added otherwise in preparing or applying the completed emulsion. The proportions of colloid to film-forming material have already been indicated above.

A suitable dispersion of soya protein (such as an isolated and hydrolyzed soya protein prepared in accordance with the teachings of the Cone and Brown U. S. Patent No. 1,955,375) may be made by heating 14 lbs. of the isolated commercial soya protein in 85 lbs. of water with about 0.1 lb. sodium hydroxide and about 2¼ lbs. of 2-amino-2-methyl-1-propanol, at a temperature of about 170° F. for three hours. The solution may then be cooled and about 1 lb. of phenol and 1 lb. of boric acid added.

6. PIGMENT

In formulating our emulsion enamels and paints, it is desirable to obtain maximum hiding with as little pigment as possible, and, therefore, it is desirable to use high-hiding pigments. Titanium dioxide is such a pigment and is very satisfactory, particularly because it is also a relatively inert pigment. As will be understood, the emulsion base containing free amine has a stable alkalinity, usually having a pH of 8.3 or more, so that pigments which are unstable in or reactive with such alkaline solutions should be avoided. In brief any pigment commonly used in paint and which is not alkali-reactive is suitable. We prefer pigments such as lithopone, titania, cadmium sulfide colors, cadmium sulfoselenide colors, iron oxide colors and ultramine blues, and as indicated, the high-hiding pigments of these classes and types are preferred particularly. Inert fillers may also be used for their usual purpose as bulking agents, but for most uses of the emulsion enamels of our invention the presence of fillers merely dilutes the effectiveness of the high-quality high-hiding prime pigments.

The emulsion enamels of our invention are pigmented in respect to the varnish or filmformer content in about the same proportions customarily used in oil paint enamels; that is, a pigment varnish ratio of up to about 1 volume of pigment to about 1 volume of film-former may be employed. If lower specular gloss is desired, then the ratio of pigment to film-forming material may be increased. Finely-ground dry pigment may be used to advantage since emulsions prepared with such pigment may be packaged directly after subjecting the emulsion to a fast rough grinding operation designed merely to break up coarse pigment agglomerates. If the emulsion is finely ground in paint mills as for oil enamels, then higher ratios of pigment to filmformer may be used for a given specular gloss.

PREPARING THE EMULSION

Various procedures may be used in preparing the emulsion, and the examples post indicate several different procedures that are satisfactory. We prefer, however, to employ a procedure in which the varnish or other film-former is first emulsified with part of the total water containing the emulsifier with or without some of the amine, after which any remaining quantity of amine needed to supply free amine and all or a major part of the stabilizing proteinaceous colloid dispersion is added and mixed to produce a concentrated emulsion. Any balance of the colloid is added gradually with mixing after which the remaining water is added, and finally the pigment, if any. As as alternative method, the pigment may be added prior to the colloid dispersion. In such procedures we prefer to prepare the emulsifier separately and to include in it that proportion of the total amine not introduced by the colloid dispersion. Also, the colloid dispersion may be prepared separately in a manner illustrated above under section 5, or as in the following examples. The varnish is, of course, prepared separately by methods which are well understood by those skilled in this art.

*Example I*

An emulsifier was prepared by mixing 10 lbs. of 2-amino-2-methyl-1-propanol with 10 lbs. of oleic acid.

A colloid solution was prepared to contain about 1½% dry alginate in water.

A colloid solution was prepared as described above under section 5 to contain about 14% isolated and hydrolyzed soybean protein.

A 25-gallon length Congo varnish containing usual amounts and kinds of driers was provided. It had an acid number of 32, and a viscosity of between Z5 and Z6 (Gardner-Holdt tubes).

Into a mixing machine equipped with a powerful impellor-type stirrer was put 50 lbs. of water and 20 lbs. of the prepared emulsifier. 295 lbs. of varnish were then added and the stirrer was turned on. The ingredients were then mixed for about 15 minutes, at which time all of the varnish had been dispersed and an oil-in-water emulsion of fine particle size had been formed. With the stirrer still running, 200 lbs. of the soya protein solution was added in 7 portions with intervals of about 2 minutes between each successive portion for mixing and blending of the portion just added. The portions were added in this sequence: 3 portions of 20 lbs. each; three portions of 30 lbs. each; and 1 portion of 50 lbs. The addition and mixing-in of the protein solution was completed after about 40 minutes. Seventy-five lbs. of the alginate solution were then added and mixed in, after which 225 lbs. of water were added with stirring while 280 lbs. of TiO₂ pigment were being added. The addition of water and pigment required about 5 minutes, and after the last of these had been added, the entire batch was stirred for about 20 to 30 minutes. The batch was then passed through a paint mill at the rate of about 120 gallons per hour, and filled into containers. A sample of the emulsion was diluted with water in proportions of 4 vol. emulsion to 1 of water and brushed onto test panels of sealed wall board and glass, and allowed to dry. Gloss measurements were then made on the coated panels, with the following results:

| Emulsion coated on: | Gloss |
|---|---|
| Glass | ¹90 |
| Sealed wall board | ¹75–80 |

¹ Gloss measurements were made with a standard Hunter gloss meter, under conditions specified by ASTM Method No. D523–41T and Method No. 610 of Federal Specification No. TT–P–141a.

A sample of this emulsion was placed in a jar, and was stored away for periodic observation. After 8 months of storage it showed no signs of deterioration or change.

*Example II*

An emulsifier was prepared by mixing 8 lbs. of 2-amino-2-methyl-1-propanol with 8 lbs. of oleic acid. Two hundred pounds of commercial soya protein dispersion were prepared by heating at 170° F. for 3 hours 28 lbs. of isolated and hydrolyzed soya protein in 163 lbs. of water containing ¼ lb. sodium hydroxide and 4½ lbs. of 2-amino-2-methyl-1-propanol, then cooling and adding 2 lbs. of phenol and 2 lbs. of boric acid. Seventy-five pounds of sodium alginate solution were prepared by dispersing 1⅛ lbs. of sodium alginate in 73⅞ lbs. of water. Two hundred ninety-five lbs. of an ester-gum varnish were provided, the acid number of the varnish being 21.8 and the viscosity being Z6+ (Gardner-Holdt tubes). The varnish and emulsifier were then mixed with 50 lbs. of water in a Werner-Pfleiderer mixer until the varnish was thoroughly emulsified. The soya protein dispersion was then added gradually over a period of above 40 minutes to the mixer and was thoroughly incorporated into the emulsion. Then the alginate solution was added and also thoroughly incorporated. Two hundred twenty-five pounds of water were then introduced over a period of about ½ hour, after which 280 lbs. of titanium dioxide pigment was added and blended with the contents of the mixer. The contents were then ground as in Example I and water-thinned samples were coated on glass and sealed wall board panels for gloss tests. Specular gloss values for the dry coatings were substantially the same as indicated in Example I.

*Example III*

Sixteen lbs. of emulsifier were prepared by mixing 8 lbs. of morpholine with 8 lbs. of oleic acid. Two hundred pounds of soya protein dispersion were prepared by heating 28 lbs. of isolated and hydrolyzed soya protein at 170° F. for 3 hours in 167 lbs. of water containing 0.6 lb. of sodium hydroxide, after which 2 lbs. of phenol and 2 lbs. of boric acid were added to the cool dispersion. Seventy-five lbs. of alginate solution were prepared as in Example II. Two hundred ninety-five pounds of Congo varnish having an acid number of 32 and viscosity of Z5 to Z6 were provided. The varnish and emulsifier were mixed with 50 lbs. of water, then mixed with the protein and alginate solution, then with 219 lbs. of water and finally with 280 lbs. of titanium dioxide pigment, all as described in Example II. The emulsion was then ground and tested for gloss on glass and sealed wall board panels with substantially the same results as found for the films of Examples I and II.

*Example IV*

Sixteen pounds of emulsifier were prepared by mixing 8 lbs. of morpholine with 8 lbs. of oleic acid. Two hundred lbs. of casein dispersion were prepared by heating 22½ lbs. of casein at 170° F. for 3 hours in 171 lbs. of water containing 2.4 lbs. of 26° Bé. commercial ammonium hydroxide, cooling, and adding 2 lbs. of phenol and 2 lbs. of boric acid. Seventy-five pounds of soya protein dispersion were prepared by heating 10½ lbs. of isolated and hydrolyzed commercial soya protein with ½ lb. sodium hydroxide and 64 lbs. of water at 170° F. for 3 hours. Two hundred ninety-five lbs. of ester-gum varnish were provided having an acid number of 21.8 and a viscosity of Z6+. The varnish was emulsified with 50 lbs. of water and the 16 lbs. of emulsifier as described in Example II, and when thoroughly emulsified it was gradually reduced with the casein dispersion and then with the soya protein dispersion. Two hundred ninety-five lbs. of titanium dioxide pigment was then incorporated and finally 223 lbs. of water was added. The emulsion was then ground as in Example I and thinned, and films thereof on glass and sealed wall board were prepared and tested for gloss. The values found for the dry films were 80 for the glass panel and 70 for the wall board panel.

*Example V*

A batch was prepared exactly as described in Example III except that 6 lbs. of stearic acid were substituted for the 8 lbs. of oleic acid mentioned in Example III. Gloss tests of the dry film on glass and sealed wall board gave values similar to those of Example III.

*Examples VI to XVI*

The following examples illustrate the effects of various amines and combinations of amines in developing gloss in protein-stabilized oleoresinous emulsions. All of these examples were prepared in like manner except that different amines were employed in the emulsifier. The varnish was an ester gum-drying oil varnish capable of drying to a glossy film and being similar to the varnish of Example II above. Commercial, isolated soya protein was used to stabilize the emulsion. A protein/varnish ratio of 1 to 10 was used, and the protein was dispersed to a protein solids content of about 15% in an aqueous solution of 2-amino-2-methyl-1-propanol (16%) and caustic soda (1%). The soaps or emulsifier were prepared to contain 20% solids and were the respective reaction products of one mol of oleic acid with 4.75 mols of the various amines. These materials were proportioned as follows:

| | Parts |
|---|---|
| Ester-gum varnish @ 100% solids | 300 |
| Protein solution | 200 |
| Emulsifier (@ 20% solids) | 70 |
| Water | 200 |

No pigment was included in these examples since its presence would obscure any pigmenting effect of the protein. Hence it will be understood that the emulsions deposited more or less transparent films depending on the effectiveness of the various amines in overcoming protein pigmentation effects.

The emulsions were prepared by mixing the varnish and protein solution until uniformly dispersed, and then mixing in the soap solution and water, and finally stirring until a translucent emulsion was produced. A part of each emulsion was then flowed onto a glass plate to produce a film thereon, and allowed to dry. The dry film of each emulsion was then rated for gloss. The results are tabulated below:

| | Soap made with this amine | Gloss Rating |
|---|---|---|
| Standard | 2-amino-2-methyl-1-propanol | Good. |
| Example VI | 2-amino-2-ethyl-1,3-propanediol | Fair to Good. |
| Example VII | ethyl monoethanolamine | Fair. |
| Example VIII | diethyl ethanolamine | Do. |
| Example IX | aminoethylethanolamine | Fair to Good. |
| Example X | 1-amino-2-methyl-2-propanol | Fair. |
| Example XI | ethyldiethanolamine | Do. |
| Example XII | 2-amino-2-methyl-1,3-propanediol | Fair to Good. |
| Example XIII | 2-amino-1-butanol | Very Good. |
| Example XIV | triisopropanolamine | Slight. |
| Example XV | dimethylethanolamine | Do. |
| Example XVI | 4-amino-4-methyl-2-pentanol | Good. |

It will be recognized that the above examples indicate the relative effectiveness of the respective amines when compared under the fixed conditions; combinations and proportions of the series. Those conditions, combinations, proportions and dilutions are not necessarily the best ones for each particular amine so that the examples do not reflect the optimum capability of each amine. Certain amines which yield only slight improvement in gloss in the above test may produce excellent gloss when employed under more suitable conditions. Hence the above examples should not be used to rate the inherent capabilities of the respective amines. The following examples (XVII to XXXII) illustrate the point in respect to only a few of the many possible variations which may be made by one skilled in the art when guided by the principles set forth in this specification. In these examples, different amines were used in dispersing the protein, and the same or different amines were used in the emulsifier, but otherwise the conditions, concentrations, proportions and methods of preparation were identical with those employed in Examples VI to XVI, inclusive.

*Examples XVII–XXXII*

| | Protein Dispersed with this Amine | Soap made with this Amine | Gloss Rating |
|---|---|---|---|
| Standard | 2-amino-2-methyl-1-propanol | 2-amino-2-methyl-1-propanol | Good. |
| Example: | | | |
| XVII | do | 2-amino-2-methyl-1,3-propanediol | Good to Fair. |
| XVIII | 2-amino-2-methyl-1,3-propanediol | 2-amino-2-methyl-1-propanol | Low to Fair. |
| XIX | do | 2-amino-2-methyl-1,3-propanediol | Low. |
| XX | 2-amino-2-methyl-1-propanol | do | Good. |
| XXI | 2-amino-2-ethyl-1,3-propanediol | 2-amino-2-methyl-1-propanol | Fair. |
| XXII | do | 2-amino-2-ethyl-1,3-propanediol | Good. |
| XXIII | 2-amino-1-butanol | 2-amino-1-butanol | Very Good. |
| XXIV | 2-amino-2-methyl-1-propanol | do | Do. |
| XXV | 2-amino-1-butanol | 2-amino-2-methyl-1-propanol | Fair to Good. |
| XXVI | 2-amino-2-methyl-1-propanol | hexanolamine[1] | Good. |
| XXVII | hexanolamine[1] | 2-amino-2-methyl-1-propanol | Do. |
| XXVIII | hexanolamine[1] | hexanolamine[1] | Poor to Low. |
| XXIX | 2-amino-2-methyl-1-propanol | aminoethylethanolamine | Fair to Good. |
| XXX | aminoethylethanolamine | 2-amino-2-methyl-1-propanol | Very Good. |
| XXXI | do | aminoethyletanolamine | Poor. |
| XXXII | do | 2-amino-2-methyl-1,3-propanediol | Very Good. |

[1] 4-amino-4-methyl-2-pentanol.

Example XXXIII

This example illustrates the use of free hydroxy amine in developing a glossy film from a protein-stabilized synthetic latex emulsion. A soya protein dispersion was prepared in the manner described under section 5 above. Since synthetic latices of butadiene styrene copolymers are currently available commercially with copolymers composed of 60–80% butadiene, 20–40% styrene, we selected as typical of this class of material a synthetic, emulsion-polymerized latex containing approximately 45% solids by weight of copolymers obtained from a 75% 1,3 butadiene-25% styrene starting mixture. The latex corresponded substantially to material prepared in accordance with the following recipe, in which the parts are by weight:

| | |
|---|---|
| Butadiene parts | 75 |
| Styrene do | 25 |
| n-Dodecyl mercaptan | 0.3–0.4 |
| Soap (sodium salts of pure saturated fatty acids, e. g. stearic or palmitic, or pure acids having a single double bond, e. g. oleic or elaidic) | 5.0 |
| Potassium persulfate | 0.30 |
| Water | 180 |
| Temperature | Approx. 50° C. |
| Final concentration | Approx. 45% solids |

The coating emulsion was prepared by mixing the protein solution and the latex emulsion, and thinning with water. The proportions were as follows:

| | Vol. |
|---|---|
| Protein solution | 1 |
| Latex emulsion (45% solids) | 3 |
| Water | 1.5 |

The finished coating emulsion was flowed on a glass plate and was allowed to dry, and the dry film was then rated for gloss. The gloss rated "Very good" in comparison with the "Standard" used in rating Examples VI–XVI.

The protein in this coating emulsion amounted to about 10% by weight of the latex solids. Free hydroxy amine was derived from the amine employed in the protein dispersion.

It will be understood that the foregoing examples of our invention produce emulsion enamels or varnishes which possess the essential combinations and proportions of ingredients, together with the concomitant requirements as to varnish and colloid particle sizes. While the examples illustrate emulsions which deposit gloss films, it will be understood that by using film-forming materials of lower gloss, by pigmenting to higher pigment varnish ratios or by employing flatting agents, fillers, etc., or by any combinations of these and other usual expedients, or by omitting the free amine, coatings of lower specular gloss may be produced. Flat paints or semi-gloss finishes may readily be produced, but, of course, our principal contribution to the art is an emulsion coating composition which deposits glossy films. Inasmuch as the prior art has not, to the best of our knowledge, provided marketable coating emulsions giving specular gloss values of more than about 35, our invention is readily distinguished from prior emulsion compositions by its ability to provide higher values such as are in the gloss and upper semi-gloss brackets. It should, of course, be understood that the invention additionally provides coating films which are of outstanding characteristics in respect to washability, durability, ease of application, and extensiveness of use. Moreover, the coating emulsions of our invention possess the great advantage of being reducible with water and of being washed from brushes, spray equipment, etc. with water.

The foregoing examples further illustrate a procedural characteristic which we have discovered, namely, the step of incorporating free amine in the emulsion at a time not later than that at which the proteinaceous colloid is incorporated. As we have indicated in section 3 above, the incorporation of the free amine prior to or at the same time as protein makes the free amine more effective in producing a glossy film. Smaller amounts of free amine may, therefore, be used, and the impairment of drying by excessive proportions of free amine is minimized. Accordingly, by giving due regard to this latter discovery we are able to produce emulsion varnish and enamel films which dry at rates comparable to those of solvent-reduced varnishes and enamels.

Those skilled in the art will recognize that many variations of our invention are possible within the limits hereinabove set forth as to the kinds of ingredients and their mutual proportions, and in view thereof the invention should be construed as limited only by the scope of the following claims.

Having described our invention, what we claim is:

1. A process for preparing a stabilized alkaline emulsion coating composition which comprises the steps of: dispersing a water-resistant film-forming material of resinous nature capable of forming a film with a specular gloss of at least about 40 in water in the presence of a small amount by weight of the film-forming material of at least one substantially neutral reaction product of a fatty acid having between 12 and 20 carbon atoms with an organic hydroxy amine; incorporating in the emulsion so formed at least enough alkali-soluble proteinaceous colloidally-dispersed material to make the emulsion brushable but not more than about 16.7% by weight of the film-forming material; and incorporating in the emulsion an organic hydroxy amine having an orientable molecular configuration of lyophilic and hydrophilic groups in a total quantity sufficient (a) to form said neutral reaction product, (b) to neutralize at least in part any available acidity of said film-forming material to a degree sufficient to enable the free amine referred to below to develop a stable alkalinity in said emulsion at a pH above about 8.3, (c) to supply any quantity of hydroxy amine needed to disperse said proteinaceous colloidal material, and (d) to supply a small quantity of free orientable hydroxy amine; at least a part of said free amine being introduced in the emulsion at a time not later than that at which the proteinaceous colloid is introduced.

2. A process as claimed in claim 1 wherein said film-forming material is an oleo-resinous material having the characteristics of varnish.

3. A process as claimed in claim 1 wherein said film-forming material is selected from the group consisting of natural rubber, butadiene polymers, elastomeric styrene polymers, butadiene-styrene copolymers, polyester elastomers, polyethylene elastomers and oil-modifications of each.

4. A water-reducible alkaline emulsion coating composition capable of being brushed, and capable of drying to a water-resistant protective film having a specular gloss of at least about 40, said emulsion consisting essentially of: (1) oleo-resinous film-forming material having the characteristics of varnish and capable of forming a film having a specular gloss of at least 40, said material being dispersed as a discontinuous phase in water substantially in particles finer than about ½ micron; (2) as an emulsifier, a small amount of a substantially neutral saponaceous reaction product of a fatty acid containing between 12 and 20 carbon atoms with an organic hydroxy amine; (3) alkali-soluble proteinaceous colloidal material dispersed in said emulsion substantially in particles finer than about one micron and in amounts making the emulsion brushable but less than about 16.7% by weight of the film-forming materials; and (4) a sufficient total quantity of organic hydroxy amine (a) to form said emulsifier, (b) to neutralize fatty acids of said oleo-resinous material to a degree sufficient to enable the free amine referred to below to develop a stable alkalinity in said emulsion at a pH above about 8.3, (c) to supply any quantity of hydroxy amine needed to disperse said proteinaceous colloidal material, and (d) to supply a small proportion of free organic hydroxy amine having an orientable molecular configuration of hydrophilic and lyophilic groups; the total quantity of hydroxy amine in said emulsion being such that the drying time of the film deposited by said emulsion is not substantially greater than the drying time of a film deposited from a similar alkaline emulsion having no free hydroxy amine.

5. A water-reducible alkaline emulsion coating composition capable of being brushed, and capable of drying to a water-resistant protective film having a specular gloss of at least about 40, said emulsion consisting essentially of: (1) oleo-resinous film-forming material having the characteristics of varnish and capable of forming a film having a specular gloss of at least 40, said material being dispersed as a discontinuous phase in water substantially in particles finer than about ½ micron; (2) as an emulsifier, a small amount of a substantially neutral saponaceous reaction product of a fatty acid containing between 12 and 20 carbon atoms with an orientable organic hydroxy amine of the kind identified below; (3) alkali-soluble proteinaceous colloidal material dispersed in said emulsion substantially in particles finer than about one micron and in amounts making the emulsion brushable but less than about 16.7% by weight of the film-forming material; and (4) a sufficient total quantity of orientable organic hydroxy amine (a) to form said emulsifier, (b) to neutralize fatty acids of said oleo-resinous material to a degree sufficient to enable the free amine referred to below to develop a stable alkalinity in said emulsion at a pH above about 8.3, and (c) to supply any quantity of hydroxy amine needed to disperse said proteinaceous colloidal material, and (d) to supply a small proportion of free organic hydroxy amine having an orientable molecular configuration of hydrophilic and lyophilic groups; the total quantity of orientable hydroxy amine in said emulsion being such that the drying time of the film deposited by said emulsion is not substantially greater than the drying time of a film deposited from a similar alkaline emulsion having no free hydroxy amine.

6. A coating composition as claimed in claim 5 which includes pigment in an amount less than that corresponding to a pigment to varnish ratio of 1 to 1 by volume.

7. A coating composition as claimed in claim 5 wherein the film-forming material is a synthetic resin varnish.

8. A coating composition as claimed in claim 5 wherein the film-forming material is a natural resin varnish.

9. A coating composition as claimed in claim 5 wherein the proteinaceous colloidal material is an isolated and hydrolyzed soya protein.

10. A coating composition as claimed in claim 5 wherein the emulsifier is the oleate of morpholine, and the free amine is morpholine.

11. A coating composition as claimed in claim 5 wherein the emulsifier is the oleate of morpholine, wherein the free amine is morpholine, and wherein the proteinaceous colloidal material is isolated and hydrolyzed soya protein.

12. A coating composition as claimed in claim 5 wherein the emulsifier is the oleate of 2-amino-2-methyl-1-propanol, and wherein the free amine is 2-amino-2-methyl-1-propanol.

13. A coating composition as claimed in claim 5 wherein the emulsifier is the oleate of 2-amino-2-methyl-1-propanol, wherein the free amine is 2-amino-2-methyl-1-propanol, and wherein the proteinaceous colloidal material is isolated and hydrolyzed soya protein.

14. A coating composition as claimed in claim 5 wherein said orientable hydroxy amine is an alcohol amine.

15. A coating composition as claimed in claim 5 wherein said orientable hydroxy amine has a ratio of total carbon atoms to total hydroxyl and amino groups of between 1 to 1 and 3 to 1.

16. A water-reducible alkaline emulsion coating composition capable of being brushed, and capable of drying to a water-resistant protective film having a specular gloss of at least about 40, said emulsion consisting essentially of: (1) water-resistant organic film-forming material of resinous nature capable of forming a film having a specular gloss of at least 40, said material being dispersed as a discontinuous phase in water substantially in particles finer than about ½ micron; (2) as an emulsifier, a small amount by weight of the film-forming material of a substantially neutral saponaceous reaction product of organic acid containing between 12 and 20 carbon atoms with an orientable organic hydroxy amine; (3) alkali-soluble proteinaceous colloidal material dispersed in said emulsion substantially in particles finer than about one micron and in amounts making the emulsion brushable but less than about 16.7% by weight of the film-forming material; and (4) a sufficient total quantity of orientable organic hydroxy amine (a) to form said emulsifier, (b) to neutralize at least a part of any available acidity of said film-forming material to a degree sufficient to enable the free amine referred to below to develop a stable alkalinity in said emulsion at a pH above about 8.3, (c) to supply any quantity of hydroxy amine needed to disperse said proteinaceous colloidal material, and (d) to supply a small proportion of free organic hydroxy amine having an orientable molecular configuration of hydrophilic and lyophilic groups; the total quantity of hydroxy amine in said emulsion being such that the drying time of the film deposited by said emulsion is not substantially greater than the drying time of a film deposited from a similar alkaline emulsion having no free hydroxy amine.

17. A coating composition as claimed in claim 16 wherein said film-forming material is selected from the group consisting of natural rubber, butadiene polymers, elastomeric styrene polymers, butadiene-styrene copolymers, polyester elastomers, polyethylene elastomers, and oil-modifications of each.

18. A coating composition as claimed in claim 16 wherein the film-forming material is composed essentially of the solids content of an emulsion-polymerized latex at about 45% solids of copolymer material composed approximately of 75% butadiene and 25% styrene.

19. A coating composition as claimed in claim 16 which contains alkali-resistant pigment in a volume not substantially greater than that corresponding to the volume of film-forming solids.

EDWARD SCHULTE.
PHILIP C. HERZOG.

REFERENCES CITED

The following references are of record in the file of this patent:

UNITED STATES PATENTS

| Number | Name | Date |
|---|---|---|
| 2,333,887 | Redlingler | Nov. 9, 1943 |
| 2,404,463 | Schmidt | July 23, 1946 |

OTHER REFERENCES

"Fire Retardant Paints for Steel Surfaces," Paint, Oil and Chem. Review, Nov. 1, 1945, pp. 129-136.

"Interior Resin, Oil, Emulsion Paints," Elm et al., Paint Industry Mag., Feb. 1943, pp. 50-54.